J. P. H. JOHNSON.
BEET HARVESTER.
APPLICATION FILED SEPT. 14, 1914.
1,146,575.
Patented July 13, 1915.
4 SHEETS—SHEET 4.
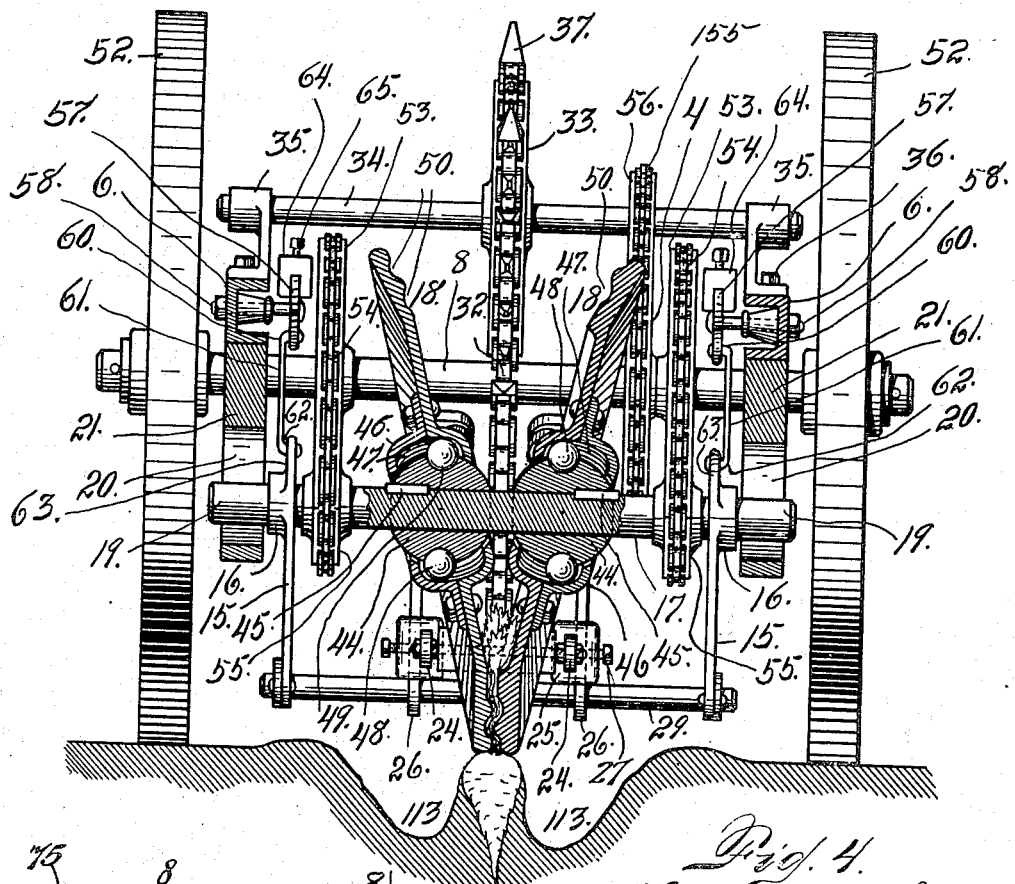
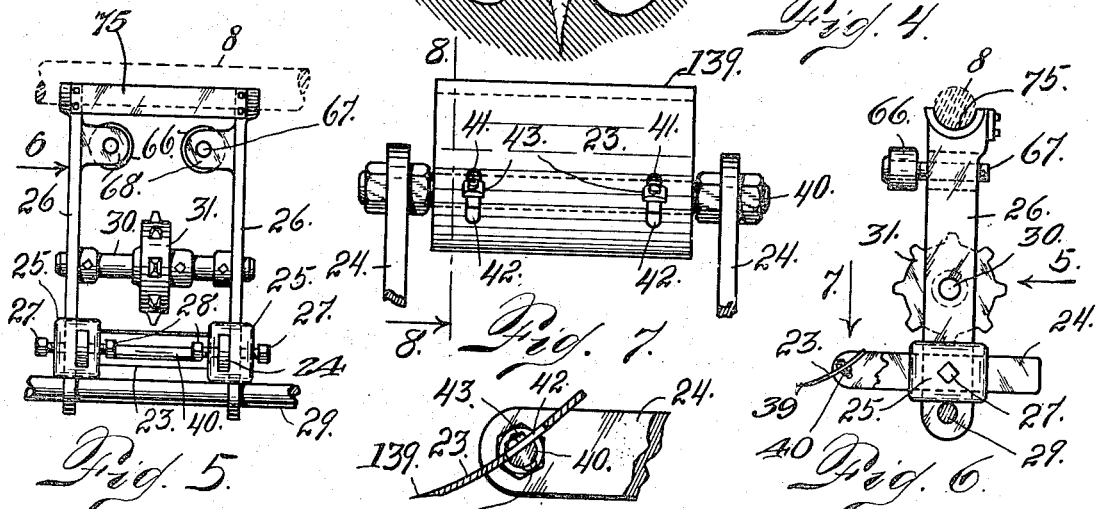
Witnesses
Otto E. Hoddick
John Babade
Inventor
J. P. H. Johnson
By A. J. O'Brien
Attorney

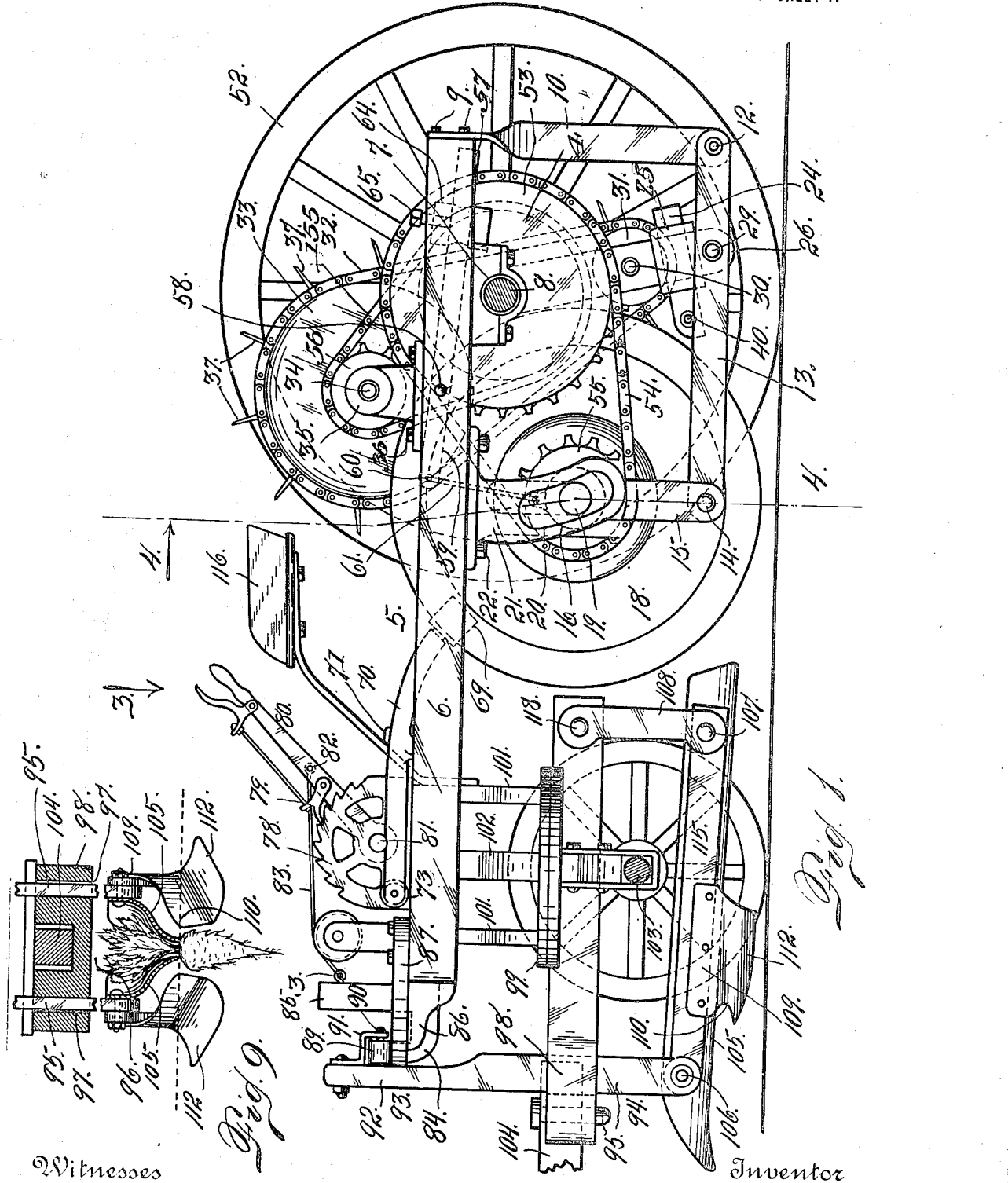

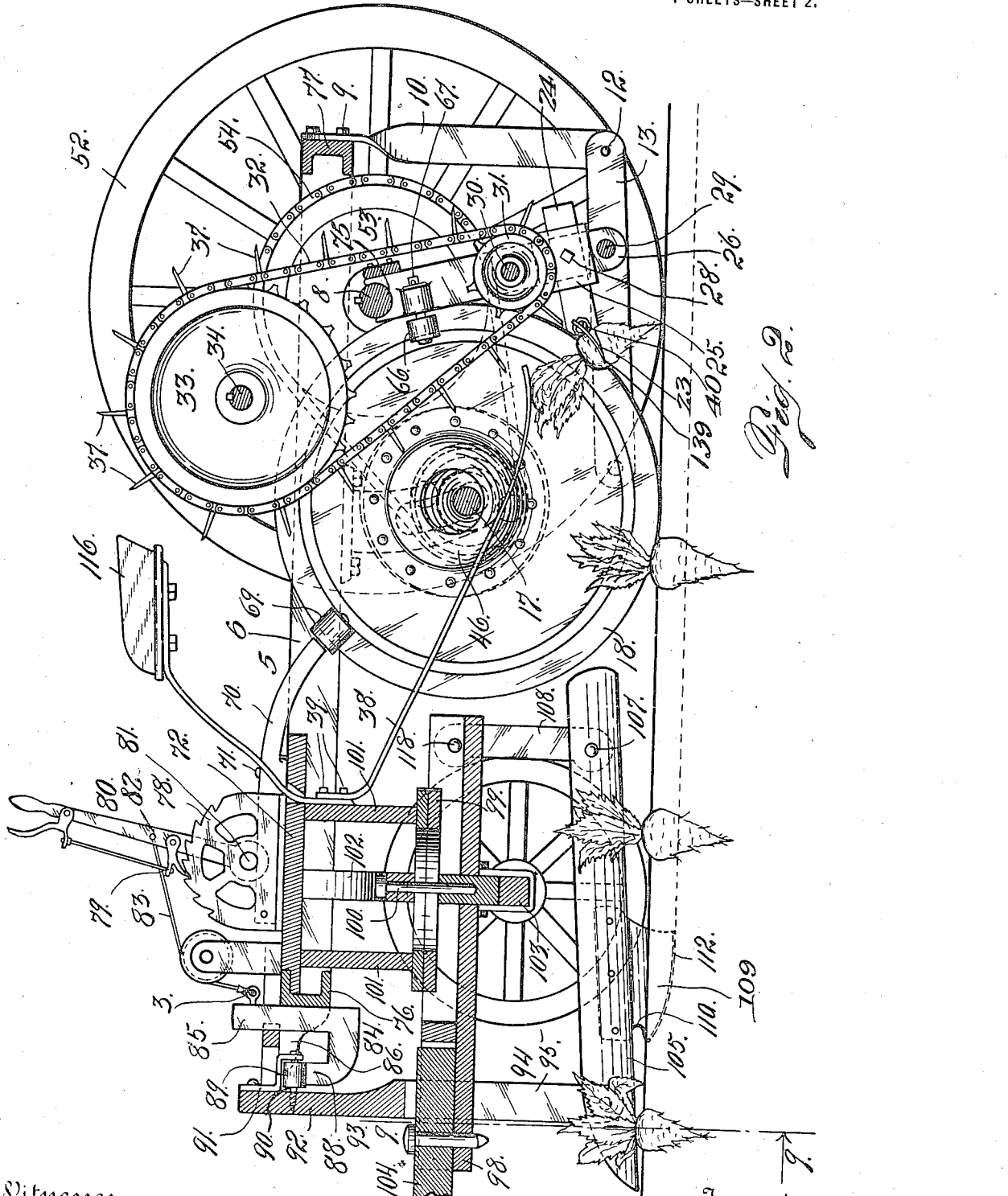

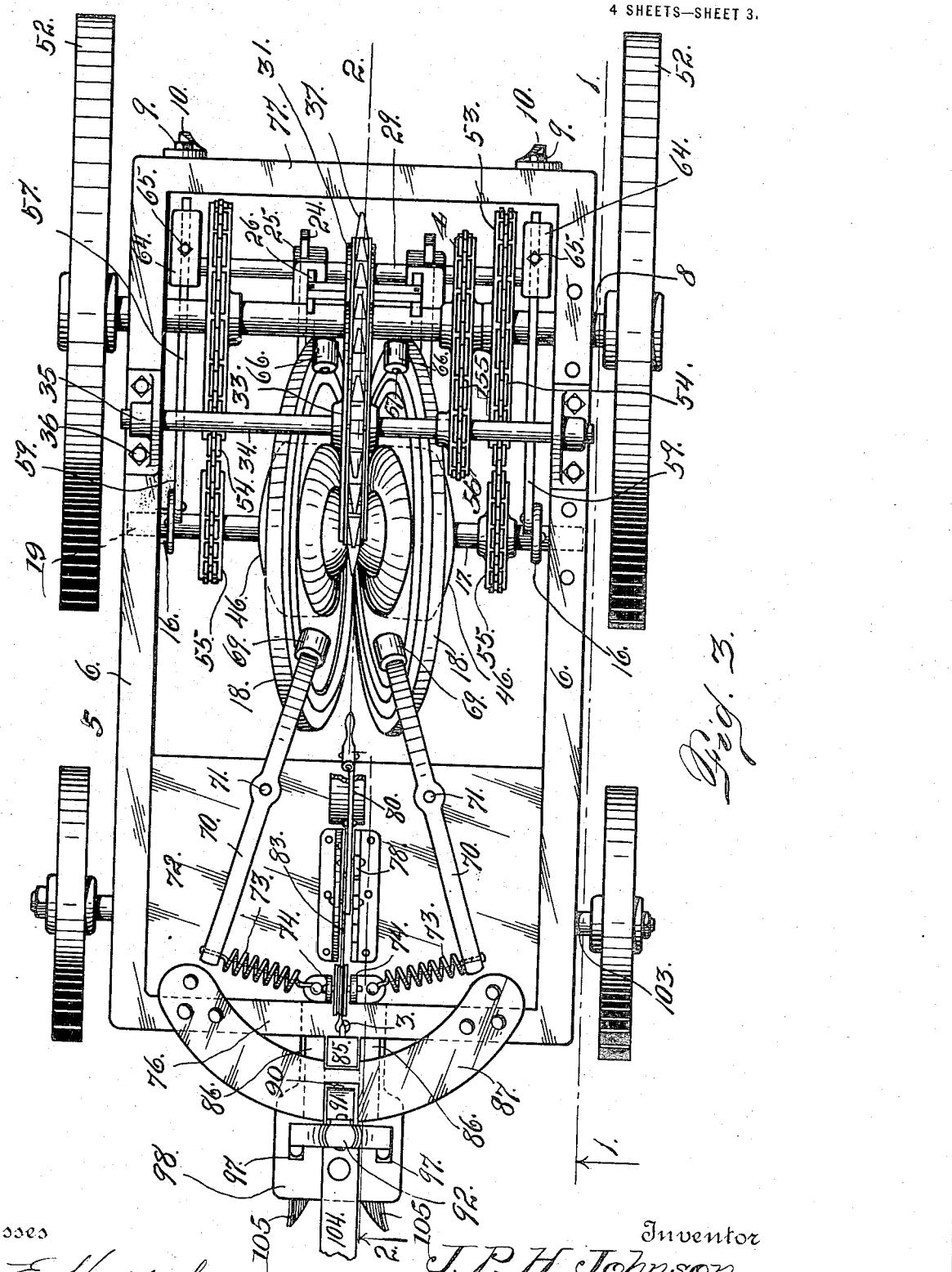

UNITED STATES PATENT OFFICE.

JOHN P. H. JOHNSON, OF DENVER, COLORADO.

BEET-HARVESTER.

1,146,575. Specification of Letters Patent. Patented July 13, 1915.

Application filed September 14, 1914. Serial No. 861,531.

*To all whom it may concern:*

Be it known that I, JOHN P. H. JOHNSON, a citizen of the United States, residing in the city and county of Denver and State of Colorado, have invented certain new and useful Improvements in Beet-Harvesters; and I do declare the following to be a full, clear, and exact description of the invention, such as will enable others skilled in the art to which is appertains to make and use the same, reference being had to the accompanying drawings, and to the characters of reference marked thereon, which form a part of this specification.

My invention relates to improvements in beet harvesters, my object being to provide a machine adapted to uproot and top beets or other similar vegetables whose bodies are normally largely below the surface of the earth and whose foliage extends above the ground.

While my improvement is particularly intended for harvesting sugar beets, it may be employed for handling other vegetables that grow in a similar manner.

My improved construction consists of a foliage gathering device mounted on the front portion of the machine, a foliage grasping-device located in the rear of the gathering device and a topping device arranged in the rear of the foliage grasping mechanism. All of these features are adjustably mounted on a suitable frame work, the entire apparatus being mounted upon the front and rear wheels which are arranged to straddle the row of beets or other vegetables to be harvested.

The foliage-grasping mechanism constitutes a very important feature of my improved construction, and the same consists of two laterally inclined disks whose lower portions approach each other where they grasp the foliage of the beets, as this foliage leaves the foliage-gathering construction. These two disks are spaced above, their upper portions being held in the spaced condition, whereby their lower portions are constructed to press tightly upon the foliage of the beets from opposite sides, thus holding the foliage tightly in place and preventing the same from interfering with the topping-knife, which is located immediately in the rear of the foliage-grasping disks.

Having briefly outlined my improved construction, I will proceed to describe the same in detail, reference being made to the accompanying drawing, in which is illustrated an embodiment thereof.

In this drawing, Figure 1 is a side elevation partly in section, of my improved beet harvester. In this view, axles only of the machine are shown in section taken on the line 1—1, Fig. 3. Fig. 2 is a vertical longitudinal section taken approximately centrally of the machine, or on a line 2—2, Fig. 3. Fig. 3 is a top plan view of the machine, or a view looking in the direction of arrow 3, Fig. 1. Fig. 4 is a cross section taken on the line 4—4, Fig. 1, looking toward the right. Fig. 5 is a rear view of the topping device, or a view looking in the direction of arrow 5, Fig. 6. Fig. 6 is a side elevation of the same, or a view looking in the direction of arrow 6, Fig. 5. Fig. 7 is a top plan view of the knife shown on a relatively large scale. Fig. 8 is a section taken on the line 8—8, Fig. 7, looking toward the right. Fig. 9 is a section taken on the line 9—9, Fig. 2, looking toward the right.

The same reference characters indicate the same parts in all the views.

Let the numeral 5 designate the relatively stationary frame work of the machine, the same including top channel bars 6 arranged on opposite sides of the machine. To the lower surfaces on these channel bars are secured journal boxes 7, in which the rear axle or driving shaft 8 of the machine is journaled. To the rear extremities of the side bars 6 are rigidly secured, as shown at 9, depending arms 10, whose lower extremities are pivotally connected as shown at 12, with links 13, which extend forwardly from the bars 10, their forward extremities being pivotally connected as shown at 14, with relatively short upwardly extending hangers 15, whose upper extremities are provided with hubs 16 in which is journaled a shaft 17, forming a support for two laterally inclined foliage-grasping disks 18. This shaft is provided with extensions 19 which project laterally beyond the hubs 16 and enter vertically elongated openings 20 formed in depending brackets 21 whose upper extremities are secured to the under surfaces of the channel bars 6, as shown at 22. By virtue of this construction, the foliage-grasping disks 18 are free to move or oscillate vertically during the operation of the machine, as may be required in performing their function. By virtue of the tilted position of these disks whereby their upper portions are considerably separated, their lower portions are brought into such proximity as to properly perform the foliage-grasping function. Hence, the lower coöperating portions of these disks are in position to ride upwardly upon such beets as project a considerable distance above the surface of the ground over which the machine is traveling. By virtue of this construction, the foliage-grasping disks always engage the entire foliage of the beets close to their body portions, and as the machine travels along, these disks hold the foliage in such position as to prevent its interfering with the topping-knife 23, which is located in the rear of the disks and in position to sever the necks of the beets or remove their tops as soon as the latter are about to leave their position between the disks.

The knife 23 is supported between two arms 24 which are supported in blocks 25 which are vertically slidable upon bars 26, the blocks and consequently, the arms 24, being held in the proper position of adjustment upon the bars 26 by means of set bolts 27 and 28 threaded into the blocks on opposite sides. The set bolts 27 engage the outer surface of the bars 26 and consequently, maintain the blocks in proper vertical adjustment: while the set bolts 28 engage the knife-carrying arms 24 and maintain them in the proper position of longitudinal adjustment. The blocks 25 when in their lowermost position, rest upon a horizontally disposed rod 29 which passes through openings formed in the lower extremities of the bars 26. The outer extremities of the rod 29 pass through openings formed in the links 13 intermediate their extremities. Above the knife and journaled in the bars 26, is a relatively short shaft 30 upon which is mounted and made fast a relatively small sprocket wheel 31, which is engaged by a sprocket chain 32, which passes forwardly around a relatively large sprocket wheel 33 mounted and made fast upon a shaft 34 whose opposite extremities are journaled in bearings 35, mounted upon the upper surface of the channel bars 6, being secured by bolts 36 or other suitable fastening devices. This sprocket chain 32 carries foliage-removing teeth 37 suitably spaced thereon. As this chain passes downwardly between the rear portions of the foliage-grasping disks 18, it is so disposed as to remove the foliage from between the disks as soon as the topping-knife has performed its function. The arrangement of the foliage-removing chain is also such as to throw the foliage in the rear of the machine as the latter passes along, whereby it is prevented from interfering with the operating parts of the apparatus. In order to further prevent the foliage from coming in contact with the operating parts of the machine, the latter is equipped with a spring arm 38 whose forward extremitiy is secured to the front part of the frame work as shown at 39. This spring arm extends rearwardly between the disks and below the shaft 17 upon which they are mounted, its rear extremity projecting beyond the shaft and into position to engage the foliage of the beets just before the topping operation is performed by the knife. By virtue of this construction and arrangement, the foliage is prevented from coming in contact with the operating parts of the machine, until it is in position to be engaged by the teeth of the foliage removing chain 32.

The topping knife 23 consists of a relatively thin steel blade whose forward extremity is sharpened as shown at 139, for the proper performance of its function. This knife is secured to a spindle 40 by means of set bolts 41, which are passed through the spindle from below, their upper extremities passing through slots 42 formed in the knife, which is secured in place upon the bolts by fastening nuts 43. By virtue of this construction and arrangement, the knife is adjustable upon the spindle by loosening the securing bolts, in which event the knife may be raised or lowered as may be desired.

The disks 18 are centrally provided with relatively large sockets which inclose balls 44, which are keyed to the shaft 17 as shown at 45. The disks are further provided with oppositely disposed housings 46, which form cavities 47 adapted to be engaged by relatively small balls 48, which are partially embedded in recesses 49 formed in the bearing balls 44. These small balls 48 form a connection between the bearing balls and the disks, since portions of the small balls engage the recesses of the bearing balls, while the other portions engage the cavities 47 of the disks. These cavities are transversely elongated (see Fig. 4) to permit the necessary lateral oscillation of the disks during the performance of their foliage-grasping function. The outer portions of the disks are corrugated as shown at 50, the grooves and ribs being staggered or oppositely arranged to properly perform the foliage grasping function.

The shaft 17 is rotated from the rear axle 8 of the machine. The opposite extremities of the axle are secured to the rear ground wheels 52, whereby as the machine travels over the field, the axle is rotated. Upon this axle are mounted and made fast two sprocket wheels 53 which are connected by means of chains 54 with smaller sprocket wheels 55, made fast on the shaft 17. The axle is further equipped on one side of the machine with a third sprocket wheel 4, which is connected by means of a chain 155 with a smaller sprocket 56 made fast upon the shaft 34, whereby the foliage-removing chain 32 is actuated.

The vertical movement of the shaft 17, together with the foliage-grasping disks and their connections, is controlled or regulated by means of levers or bars 57, which are fulcrumed upon the frame bars 6 by means of bolts 58. The forward arms 59 of these levers or their portions forward of their fulcrums are connected at their forward extremities as shown at 60, with depending links 61, whose lower extremities are connected as shown at 62, with upwardly projecting lugs 63 formed on the hubs 16 of the hangers 15. The rear arms of these levers or their portions extending beyond their fulcrums, are equipped with adjustable weights 64 of suitable mass, whereby the shaft 17 and the disks 18 together with the hangers 15 and their connections are counterbalanced. In other words, the weights 64 which are longitudinally adjustable upon the levers by means of set bolts 65, are of such mass as to rise and fall as it becomes necessary for the foliage-gathering disks to move upwardly and downwardly during the proper performance of their function and as may be required due to the variation of the projection of the different beets above the surface of the earth. By virtue of this construction and arrangement, the pressure of the disks upon the ground or upon the tops of the beets whose foliage they grasp, may be accurately regulated and controlled.

By virtue of the construction heretofore described, whereby the bars 26 are supported upon the rod 29 which itself engages at its opposite extremities the links 13, it will be understood that the knife will be raised and lowered or vertically adjusted to harmonize with the vertical adjustment or variation of the foliage-grasping disks during the operation of the machine. This is as it should be, since if the neck of a beet is relatively high or in other words, if the part of the beet projects above the ground to a considerable distance, as the disks travel upwardly to engage the top of its body portion, it is necessary that the knife should have a corresponding upward movement in order to remove the foliage at the proper depth. By virtue of this construction the operation of the machine is approximately perfect.

In order to maintain the disks 18 in their properly separated position above and in their foliage-grasping position below, I employ two pairs of rollers. The rollers of one of these pairs are mounted upon the bars 26 and are designated by the numeral 66. These rollers are mounted on spindles 67 which engage bearings 68 carried by the arms 26. The rollers 66 project forwardly from these bearings and engage the inner portions of the rims of the disks 18 on the inside, and considerably in the rear of the shaft upon which the disks are mounted. These rollers (see Fig. 3) are properly spaced transversely for the proper performance of their function, or for the purpose of maintaining the upper portions of the disks properly spaced or separated in the rear, in order to cause their lower portions to assume such proximity as to facilitate the proper performance of the foliage-grasping function. The upper portions of the disks are further acted upon by forwardly located rollers 69 which are journaled on the rearward extremities of levers 70 which are fulcrumed as shown at 71. On a forward platform 72 carried by the machine, the forward extremities of these levers, or their extremities forward of their fulcrums, are connected by means of coil springs 73 with stationary lugs 74 which are also secured to the platform 72. These springs 73 are normally under such tension as to give the forward arms 70 of the levers a relatively strong inward tendency, while the rear extremities of the levers are given a relatively strong outward thrust, and as the rollers 69 are in direct contact with the inner surfaces of the disks 18 above the shaft upon which the disks are mounted, the upper portions of these disks may be held in the properly spaced condition in order that their lower portions may properly grasp the foliage of the beets, as heretofore explained.

The upper extremities of the bars 26 are provided with half bearings 75, which are adapted to engage the axle 8 from below. By virtue of this arrangement, the upward movement of the knife-carrying structure is limited. This is also true with reference to the corresponding movement of the links 13, the hangers 15, the shaft 17 and their connections.

The side frame bars 6 of the machine are connected at their front and rear ends by transverse members 76 and 77, which as illustrated in the drawing, are formed integral with the side bars. In other words, as disclosed in the drawing, the top frame work of the machine is of rectangular shape, being composed of a continuous channel bar. The platform 72 is mounted upon this frame, its opposite ends being connected with the side bars and its forward edge with the front transverse member. Centrally mounted upon the platform, is a toothed quadrant 78, which coöperates with a pawl 79 carried by a hand lever 80 fulcrumed at its lower extremity as shown at 81. A cable 83 is connected at its rear extremity with the lever 80, as shown at 82, while its forward extremity is connected as shown at 3 with a vertically-movable-carrier device 84. This carrier device is provided with a rearwardly located arm 85 which passes between two brackets 86 on opposite sides, the front frame bar 76 in the rear and the curved track plate 87 in front. This carrier is also provided with a relatively short forwardly located arm 88 whose upper extremity engages a roller 89 journaled on a spindle 90, one extremity of which is supported by an angle bracket 91, while its opposite extremity engages the downwardly projecting arm 92 of a vertically movable member 93 whose lower portion 94 is bifurcated, being composed of two arms 95 which are spaced as shown at 96 to enter openings 97 formed in a block 98 rigidly secured to the lower movable member 99 forming a part of the fifth wheel construction of the machine. This block 98 is connected with the upper portion of the fifth wheel construction by the usual pin 100. This upper member is rigidly connected with the platform 72 in any suitable manner, as by front and rear vertically disposed parts 101 and a centrally located part 102. The forward axle 103 of the machine is rigidly connected with the block 98. This axle is normally or when the machine is in use, prevented from turning by virtue of the position of the roller 89 between the two brackets 86. When the carrier 84 is raised by the proper manipulation of the lever 80, to the position shown in Fig. 1, the front axle, together with the wheels journaled thereon, may be turned in the same manner as the usual vehicle, since in this event, the roller 89 is raised to a position above the curved track plate 87, in which event, the roller may move freely in either direction on said plate, as the tongue 104 of the vehicle is moved in one direction or the other, for the purpose of turning the machine.

The forward extremities of two foliage-gathering members 105 are pivotally connected as shown at 106, with the lower extremities of the arms 95 of the vertically movable member 93. The two members 105 are relatively long, longitudinally disposed and transversely spaced. Their upper edges are farthest apart and the two members gradually approach each other as they extend downwardly, their lower edges being spaced sufficiently only to closely engage the foliage of the beets close to the upper extremities of the latter, whereby, as the machine moves along, the members 105 gather the foliage and raise it between the two members, the foliage being held in this position until it leaves the rear extremities of the members 105, and is taken up or grasped by the disks 18, as heretofore explained. The rear extremities of the foliage-gathering members 105 are pivotally connected as shown at 107, with links 108, whose upper extremities are connected with the rear extremity of the rigid block as shown at 118. By virtue of this construction the foliage-gathering members 105 may be raised and lowered as the member 93 is vertically actuated. When the members 105 are in use for foliage-gathering purposes, as illustrated in Fig. 2, they are downwardly inclined slightly from their rear extremities, whereby their forward extremities where the foliage is first engaged, are lowermost. When these forward extremities are raised as illustrated in Fig. 1, the members 105 are in the inactive position and the machine may be moved from place to place without interference therefrom.

Secured to links 115 arranged on opposite sides of the members 105, are exteriorly located curved blades 109. The upper edges of these blades lie flat against the links 115. The blades, however, extend below the lower edges of the said links and are first curved inwardly abruptly as shown at 110, and then outwardly, as shown at 112, forming plows which are adapted to remove the earth on opposite sides of the body of the beets, as best illustrated in Fig. 4, whereby depressions 113 are formed on opposite sides of the row, thus leaving the beets in position to be up-rooted by the disks 18, as they carry the foliage upwardly to the position for topping, as indicated by the position of the rearmost beet in Fig. 2. It will thus be seen that my improvement performs both the up-rooting and topping function. In other words, it is a complete beet harvester, since it up-roots and tops the beets, leaving them in condition to be placed in wagons and carried to the factory.

The links 115 are pivotally connected at their front and rear extremities with the arms 95, of the vertically movable member 93, and with the links 108. In other words, these links are supported in the same manner and by the same means as the members 105 of the foliage-gathering device, the links forming the support for the plows and giving additional strength and rigidity to the members 105 which are preferably made of metal and therefore, relatively thin.

From the foregoing description, the use and operation of my improved construction will be readily understood. The machine is drawn across the field in such position that the foliage-gathering members 105, together with the plows 109 are arranged on opposite sides of the row of beets. The forward extremities of the members 105 being lowermost, pick up the normally spread foliage of the beets and raise it away from the body of the beets, leaving the ground clear on opposite sides, whereby the plows 109 which are located somewhat in the rear of the forward extremities of the members 105, are free to remove the earth on opposite sides of the row as shown at 113 in Fig. 4. As the machine continues, the foliage is maintained in the raised position between the members 105 until it passes into position between the foliage-grasping disks 18. As the latter rotate, the beets are gradually removed from the ground and carried upwardly a short distance, whereby they are brought into position as soon as they are up-rooted, to be acted upon by the knife 23, which removes the top in the manner illustrated in Fig. 2. During this operation, the rearwardly extending spring member 38 acts upon the foliage, preventing it from coming into contact with the moving parts of the machine in such a manner as might interfere with its operation. As soon as the foliage leaves the rear extremities of the members 38, it is engaged by the teeth 37 of the foliage removing or clearing chain 32, which carries it rearwardly beyond the mechanism of the machine. At the same time, the beets drop downwardly, assuming a general position in line with the row. During this operation, the driver or person in charge of the machine, occupies a seat 116, which is so located as to be in convenient proximity to the lever 80, which may be manipulated for the purpose of raising or lowering the foliage-gathering members 105 during the operation of the machine. When desired, however, the lever may be moved rearwardly a sufficient distance to raise the members 105 considerably above the ground, or out of operative relation with the row of beets (see Fig. 1). This is the position of the machine when not in use or when turning at the end of the field or driving from place to place. When the lever is thus manipulated (see Fig. 1) the front wheels of the machine may turn readily upon the pin 100, as may be required in turning the machine at either end of the field. During the turning operation, the roller 89 will travel upon the curved track 87, as will be readily understood. After the machine is turned and is in position to start upon another row, the roller will be brought back to its central position on the track 87, and the lever 80 will be adjusted from the position shown in Fig. 1 to the position shown in Fig. 2, when the machine will be ready for the next row of beets.

Having thus described my invention, what I claim is,—

1. A beet harvester provided with a combined foliage-grasping and beet-up-rooting device composed of two rotary disks laterally inclined to cause their lower portions to approach each other while their upper portions are correspondingly spaced, the disks being mounted to oscillate, whereby the aforesaid relation may be maintained.

2. A beet harvester provided with a combined foliage-grasping and beet-up-rooting device composed of two rotary disks mounted to oscillate freely laterally, and means for approximately maintaining the said disks in a uniform position of lateral inclination, whereby their lower portions are caused to approach each other for foliage grasping purposes.

3. In a beet harvester, the combination with a frame, of combined foliage-grasping and beet-uprooting means, composed of two disks mounted to oscillate freely, and means engaging the portions of the disks above their axes and on the inside for crowding their upper portions outwardly and their lower portions inwardly for foliage-grasping purposes.

4. A beet harvester provided with a combined foliage-grasping and beet-uprooting device composed of a pair of rotary disks mounted to oscillate freely laterally, and means engaging the disks on the inside above their axes, and pressing the upper portions of the disks outwardly, whereby their lower portions are caused to approach each other for foliage-grasping purposes said means consisting of anti-frictional devices.

5. The combination with a frame, of a combined foliage-grasping and beet-uprooting device mounted thereon and composed of two disks mounted to oscillate laterally, and means for maintaining the disks approximately in uniformly inclined positions, whereby their upper portions are widely spaced relatively, while their lower portions are brought into foliage-grasping proximity, said means comprising anti-frictional devices acting to press the upper portions of the disks outwardly.

6. The combination with a frame, of a combined foliage-grasping and beet-uprooting device mounted thereon and composed of two disks mounted to oscillate laterally, and means for maintaining the disks approximately in uniformly inclined positions whereby their upper portions are widely spaced relatively, while their lower portions are brought into foliage-grasping proximity, said means comprising a pair of forwardly and a pair of rearwardly located rollers engaging the inner surfaces of the disks above their axes.

7. A beet harvester including a combined foliage-grasping and beet-uprooting device comprising a shaft mounted to rotate, a pair of disks connected to rotate with the shaft but mounted to oscillate laterally freely thereon, and means for maintaining the disks in an inclined position, whereby their lower portions are uniformly relatively close together and whereby their upper portions are correspondingly spaced.

8. A machine of the class described, including a shaft and a pair of disks connected to rotate therewith and free to oscillate laterally thereon.

9. A machine of the class described including a shaft and a pair of disks connected to rotate therewith and free to oscillate laterally thereon, and means for maintaining the disks in inclined positions during rotation, whereby their lower portions continuously approach each other for foliage-grasping purposes, while their upper portions are correspondingly spaced.

10. A machine of the class described including a frame, a shaft journaled thereon and a pair of disks mounted on the frame to turn therewith and to oscillate laterally thereon, whereby they may be moved to a position inclined to the axis of the shaft to cause their lower portions to approach each other while their surfaces above gradually recede from each other to form a figure approximately V-shaped in front or rear view, and means for maintaining the disks uniformly in the aforesaid relation.

11. A machine of the class described including a shaft and a pair of disks mounted to turn with the shaft, and to oscillate laterally thereon, and means for maintaining the disks approximately uniformly in inclined positions, whereby their lower portions are caused to grasp the foliage of the beets and uproot them as the lower portions of the disks travel rearwardly.

12. In a beet harvester, the combination with a forwardly located foliage-gathering means, foliage-grasping and beet-uprooting means located in the rear of the foliage-gathering means, the foliage-grasping and beet-uprooting means including two disks normally laterally inclined, whereby their lower portions are maintained in the foliage-grasping relation, a knife located in the rear of the foliage-grasping and beet-uprooting means and coöperating therewith for removing the beet tops, and means operated between the disks for clearing the foliage after the tops have been removed by the knife.

13. In a beet harvester, the combination with a forwardly located foliage-gathering means, foliage-grasping and beet-uprooting means located in the rear of the foliage-gathering means, the foliage-grasping and beet-uprooting means including two disks normally laterally inclined, whereby their lower portions are maintained in the foliage-grasping relation, a knife located in the rear of the foliage-grasping and beet-uprooting means, and coöperating therewith for removing the beet tops, and means operated between the disks for clearing the foliage after the tops have been removed by the knife, said means including an endless chain carrying teeth spaced for engaging the foliage.

14. In a beet harvester, the combination with a frame, of a forwardly located foliage-gathering device, a combined foliage grasping and beet-uprooting device located in the rear of the first named device, the second named device comprising a shaft and a pair of disks mounted to oscillate freely laterally thereon, means for maintaining the disks approximately in uniformly inclined positions whereby their upper portions are relatively widely spaced and their lower portions caused to approach each other for foliage-grasping purposes, a spring member whose forward extremity is mounted upon the frame, said member extending rearwardly between the disks, below the axis and adapted to engage the foliage of the beets before the tops are removed, a knife located in the rear of the foliage-grasping and beet-uprooting device, and coöperating with the latter for top-removing purposes, and a foliage-clearing device placed between the disks said last named device comprising an endless chain carrying teeth adapted to engage the beet tops after they have been removed by the knife, substantially as described.

In testimony whereof I affix my signature in presence of two witnesses.

JOHN P. H. JOHNSON.

Witnesses:
 MAZE KIRBY,
 A. EBERT O'BRIEN.